(12) United States Patent
Hunt et al.

(10) Patent No.: US 9,351,163 B2
(45) Date of Patent: May 24, 2016

(54) AUTOMATIC SANITIZATION OF DATA ON A MOBILE DEVICE IN A NETWORK ENVIRONMENT

(71) Applicant: McAfee, Inc., Santa Clara, CA (US)

(72) Inventors: Simon Hunt, Naples, FL (US); Brian T. Robison, Klamath Falls, OR (US)

(73) Assignee: McAfee, Inc., Santa Clara, CA (US)

( * ) Notice: Subject to any disclaimer, the term of this patent is extended or adjusted under 35 U.S.C. 154(b) by 214 days.

(21) Appl. No.: 13/727,510

(22) Filed: Dec. 26, 2012

(65) Prior Publication Data
US 2014/0181998 A1    Jun. 26, 2014

(51) Int. Cl.
*H04W 12/08* (2009.01)
*G06F 21/62* (2013.01)
*H04L 29/06* (2006.01)

(52) U.S. Cl.
CPC .............. *H04W 12/08* (2013.01); *G06F 21/62* (2013.01); *H04L 63/108* (2013.01); *G06F 2221/2137* (2013.01); *G06F 2221/2143* (2013.01); *H04L 63/20* (2013.01)

(58) Field of Classification Search
CPC .................. H04L 63/108; H04L 63/20; G06F 2221/2143; G06F 2221/2137; G06F 21/62; H04W 12/08
See application file for complete search history.

(56) References Cited

U.S. PATENT DOCUMENTS

| 5,987,610 A | 11/1999 | Franczek et al. |
|---|---|---|
| 6,073,142 A | 6/2000 | Geiger et al. |
| 6,460,050 B1 | 10/2002 | Pace et al. |
| 7,506,155 B1 | 3/2009 | Stewart et al. |
| 7,703,125 B2 * | 4/2010 | Motoyama ........................ 726/1 |
| 8,595,336 B1 * | 11/2013 | Tsern et al. ................... 709/221 |
| 2006/0013191 A1 | 1/2006 | Kavanagh |

(Continued)

FOREIGN PATENT DOCUMENTS

| KR | 2006-0069981 | 6/2006 |
|---|---|---|
| KR | 2006-0116089 | 11/2006 |

(Continued)

OTHER PUBLICATIONS

International Search Report and Written Opinion in International Application No. PCT/US2013/071305, mailed Mar. 11, 2014, 9 pages.

(Continued)

*Primary Examiner* — Jung Kim
*Assistant Examiner* — Tri Tran
(74) *Attorney, Agent, or Firm* — Patent Capital Group

(57) ABSTRACT

A method is provided in one example embodiment and includes establishing a network connection to a central security system in a central network, receiving a message from the central security system, activating a grace window based on the message, and determining whether the grace window has expired. The method further includes deleting, when the grace window expires, one or more objects from the mobile device based on a sanitization policy. In specific embodiments, the network connection is terminated before the grace window expires, and the grace window expires unless the mobile device establishes another network connection with the central security system. In further embodiments, the method includes receiving the sanitization policy from the central security system. The sanitization policy identifies the one or more objects to be deleted from the mobile device when the grace window expires.

24 Claims, 7 Drawing Sheets

(56) References Cited

U.S. PATENT DOCUMENTS

| | | | |
|---|---|---|---|
| 2006/0021006 A1* | 1/2006 | Rensin et al. | 726/2 |
| 2006/0089126 A1* | 4/2006 | Frank et al. | 455/411 |
| 2007/0035390 A1* | 2/2007 | Thomas et al. | 340/539.11 |
| 2007/0298767 A1* | 12/2007 | Brown et al. | 455/411 |
| 2008/0004886 A1* | 1/2008 | Hames et al. | 705/1 |
| 2008/0263271 A1* | 10/2008 | Kishi et al. | 711/111 |
| 2009/0165083 A1* | 6/2009 | McLean et al. | 726/1 |
| 2011/0016513 A1 | 1/2011 | Bailey, Jr. | |
| 2011/0022843 A1 | 1/2011 | Blom et al. | |
| 2012/0149338 A1* | 6/2012 | Roundtree | 455/411 |
| 2012/0269346 A1 | 10/2012 | Best et al. | |

FOREIGN PATENT DOCUMENTS

| | | | |
|---|---|---|---|
| KR | 2007-0060657 | | 6/2007 |
| WO | 2014/105307 A1 | | 7/2014 |

OTHER PUBLICATIONS

Flocchini, Andrew, "How-To: Remotely Wipe an iPhone Using Exchange," Feb. 4, 2010, retrieved on Dec. 21, 2012 at http://gigaom.com/apple/how-to-remotely-wipe-aniphone-using-exchange/, 15 pages.
"Remote Device Wipe," Microsoft, copyright 2012, retrieved on Dec. 21, 2012 at http://technet.microsoft.com/en-us/library/cc539118.aspx, 1 page.
Savitz, E., "Mobile Security: The Fallacy of Remote Wiping Your Phone," Jul. 10, 2012, retrieved on Dec. 21, 2012 from http://www.forbes.com/sites/ciocentral/2012/07/10/mobile-security-the-fallacy-of-remote-wiping-your-phone-2/, 4 pages.
International Preliminary Report on Patentability in International Application No. PCT/US2013/071305, mailed Jul. 9, 2015, 8 pages.
Notice of Preliminary Rejection in KR Application No. 2015-7013877, mailed on Mar. 21, 2016, English translation, 5 pages.

* cited by examiner

AUTOMATIC SANITIZATION OF DATA ON A MOBILE DEVICE IN A NETWORK ENVIRONMENT

TECHNICAL FIELD

This disclosure relates in general to the field of mobility and, more particularly, to automatic sanitization of data on a mobile device in a network environment.

BACKGROUND

The field of computer network security has become increasingly important and complicated in today's society. Computer network environments are configured for virtually every enterprise and organization, typically with multiple interconnected computers (e.g., end user computers, laptops, servers, mobile devices, etc.). In many such enterprises, Information Technology (IT) administrators may be tasked with the control and security of data in the network environment, including executable software files and confidential, sensitive data, and proprietary data on hosts, servers, and other computers.

Increasingly, mobile devices are being integrated into protected network environments, such as enterprises, homes, and other entities. These mobile devices have powerful computing systems that operate on various platforms and have the ability to provide users with network access connectivity and access to needed resources, even when in transit. With the growing trend of consumerization and 'Bring Your Own Personal Computer' (BYOPC) policies, it is becoming more and more common to find data from protected networks (e.g., corporate networks, government networks, home networks) on mobile devices of individuals associated with the protected network. In some instances, these mobile devices might even be personally owned devices. Accordingly, techniques to prevent the misappropriation of data on mobile devices are needed, particularly as the proliferation of mobile devices with access rights to protected networks continues.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Example Embodiments

Figure 1:
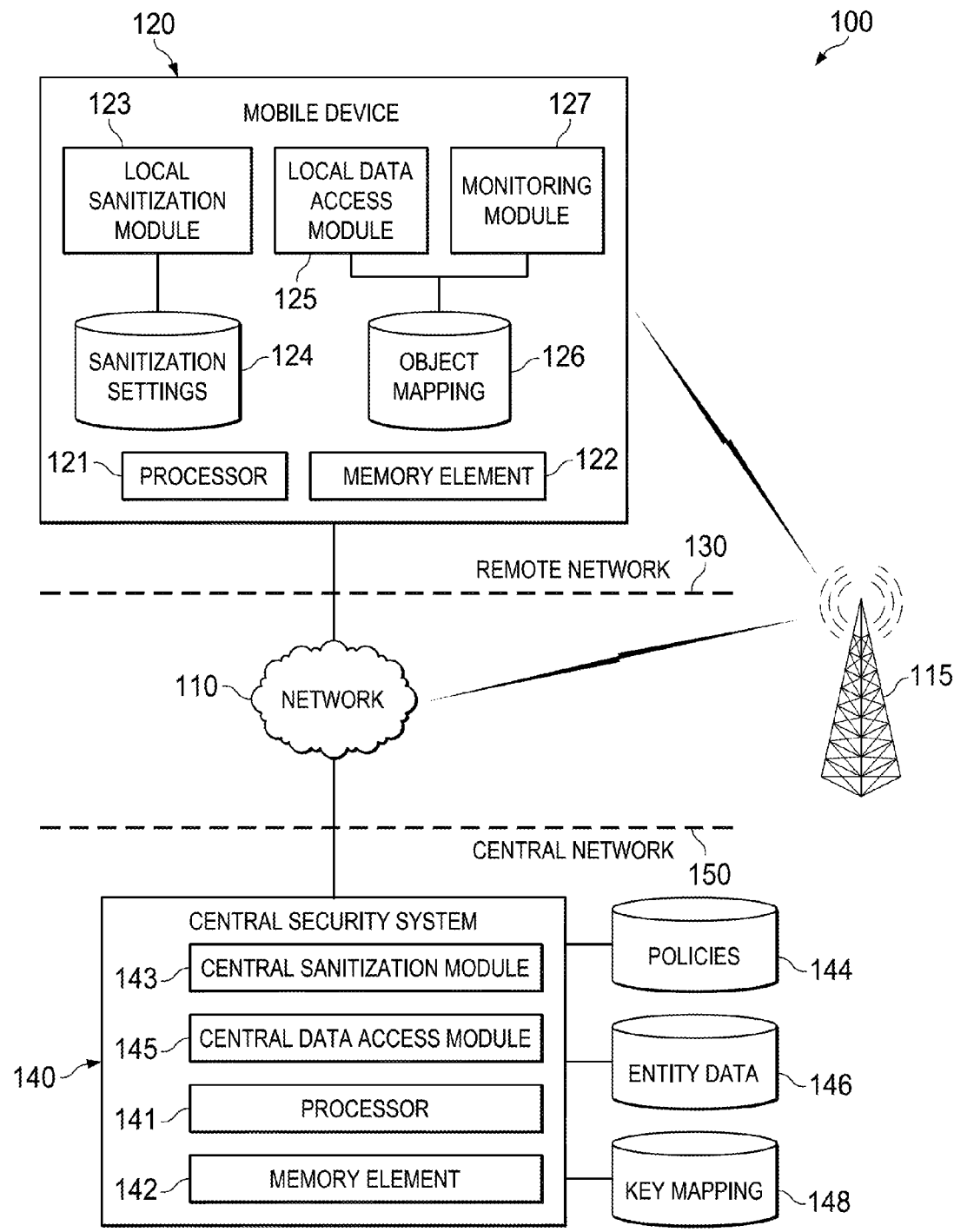
FIG. 1 is a simplified block diagram illustrating a communication system for automatic sanitization of data on a mobile device in a network environment, according to an example embodiment of the present disclosure.

FIG. 1 is a simplified block diagram illustrating an example implementation of a communication system 100 for automatic sanitization of a mobile device in a network environment. Communication system 100 can include a mobile device 120 in a remote network 130, a central security system 140 in a central network 150, and network 110 (e.g., a wide area network such as the Internet), which facilitates communication between networks 130 and 150. Mobile device 120 may also be capable of communication with central network 150 via a radio tower 115. Radio tower 115 can communicate with a mobile service provider network (not shown) that converts radio signals to data packets to enable communication to central security system 140 via network 110. Mobile device 120 can include a processor 121 and a memory element. Embodiments of mobile device 120 can also include one or more of a local sanitization module 123, sanitization settings 124, a monitoring module 127, a object mapping 126, and a local data access module 125. Central security system 140 can include a processor 141 and a memory element 142. Embodiments of central security system 140 can include one or both of a central sanitization module 143 and a central data access module 145. Additionally, one or more storage elements containing various data may be provided in, or accessible to, central security system 140. Such storage elements may include policies 144, entity data 146, and key mapping 148.

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs. Additionally, radio signal communications over a cellular network may also be provided in communication system 100.

For purposes of illustrating the techniques of communication system 100, it is important to understand the network communications that may be traversing the network environment, shown in FIG. 1, and the security concerns that may be present. The following foundational information may be viewed as a basis from which the present disclosure may be properly explained. Such information is offered for purposes of explanation only and, accordingly, should not be construed in any way to limit the broad scope of the present disclosure and its potential applications.

Advances in hardware and communication technologies have resulted in the proliferation of mobile devices, such as smartphones, and mobile network environments all over the world. As a result, many protected network environments allow access to some or all of their resources by mobile devices of employees or other authorized individuals. In addition, BYOPC policies often encourage the use of personal mobile devices to perform job-related functions. Consequently, mobile devices are becoming commonplace for employees and other individuals that access protected networks.

Various technologies exist to support and enable access to protected networks by mobile devices. For example, technologies exist to dynamically reflect data 'over the air' onto mobile devices that request or otherwise receive the data from a particular network. Thus, mobile devices may receive and store data owned by a protected network, which could include confidential, sensitive, or proprietary data. An entity may desire to protect such data from inadvertent data leakage and outright misappropriation. For some entities, compromised data can implicate federal and/or state laws that could require significant time and resources to rectify. Furthermore, an individual may keep personal information on a mobile device including, for example, personal emails, financial information, health information, contacts, etc.

Technologies also exist to wipe information or data from a mobile device on-demand. For example, if a mobile device is lost or stolen, a central point of the protected network can be configured to sanitize the mobile device by wiping (e.g., deleting, moving to another device, etc.) information on demand from the missing mobile device in response to a specified trigger. The trigger could occur when the mobile device is powered on and attempts to access the protected network. If the mobile device is in 'airplane mode' or is disconnected from the network, however, the then central point may never receive the trigger. Thus, there is no certainty that the mobile device will be sanitized. In fact, the mobile device could potentially retain the content indefinitely. Moreover, sophisticated thieves may understand the device wipe technology and take preventative steps to avoid a device wipe, and thus enable unrestricted access to the data.

The communication system for automatic sanitization of mobile devices of FIG. 1 resolves many of the aforementioned issues and more. In communication system 100, a mobile device is configured to sanitize itself by automatically wiping (e.g., deleting, removing) selected objects or all objects after an allowable period of disconnection from a central network. This allowable period is also referred to herein as a 'grace window,' which is generally defined as a period of time allowed before the occurrence of an event. The mobile device is sanitized if it does not establish a network connection to the central network before the expiration of the grace window. Additionally, or alternatively, an embodiment allows a user to access certain objects only after specifically requesting access to such data. The objects may be wiped, and/or a decryption key for the objects may be wiped, from the mobile device after an allowable period (or grace window) of data access to the objects. Thus, the mobile device can automatically sanitize itself (e.g., by deleting all or selected decryption information and/or all or selected objects) regardless of whether the central security system is online or offline.

In one example, a grace window can be activated using an expiry time that indicates a date and time when the grace window expires. In another example, a grace window can be activated using an amount of time that indicates the length of time allowed for the grace window. In one embodiment, the length of time allowed for the grace window corresponds to the length of time the mobile device is permitted to be disconnected from the central security system. In another embodiment, the length of time allowed for the grace window corresponds to the length of time the mobile device is permitted to access one or more objects on the mobile device. A grace window for disconnection can be measured by adding the amount of time to the last connection time of the mobile device and the central network. A grace window for data access can be measured by adding the amount of time to the connection time corresponding to the network connection of the mobile device and the central network when the mobile requested access to one or more objects. In example embodiments, an amount of time or an expiry time could be configured per mobile device (or user), per groups of mobile devices (or users), per network, or per objects that are requested.

Turning to FIG. 1, a brief description is provided about some of the possible infrastructure that may be included in communication system 100. Generally, communication system 100 may be implemented in any type or topology of networks. Network 110, remote network 130, and central network 150 each represent a series of points or nodes of interconnected communication paths for receiving and transmitting packets of information that propagate through communication system 100. These networks offer a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In an example implementation, central network 150 could be a protected network that mobile device 120 is configured and authorized to access. As used herein, a 'protected network' is intended to include a network that is owned or otherwise under the control of a particular entity or organization. Communications attempting to reach certain nodes in the protected network may first be routed through one or more network elements of the protected network, such as a gateway, a firewall, a proxy server, a security appliance, etc., to facilitate network communication and to control the flow of data into and out of the protected network. In an example embodiment, a protected network may be a private network that uses private address space (e.g., Internet Protocol (IP) address space) for its nodes on the network. Private address space may follow standards set by Network Working Group, Requests for Comments (RFC) 1918, Y. Rekhter, et al., February 1996 and/or Network Working Group, Requests for Comments (RFC) 4193, R. Hinden, et al., October 2005. A protected network may also or alternatively implement any other suitable forms of address spacing that allow a particular entity or organization to control network traffic to and from the protected network.

In another example implementation, the central network 150 could be a cloud network. A cloud network could be separate from a protected network that the mobile device is configured and authorized to access. The cloud network could be owned or otherwise under the control of the entity associated with the protected network. In another instance, the cloud network may be owned by a third party, with central security system 140 and its associated data being owned, or otherwise under the control of, the same entity associated with the protected network. These implementations are intended for illustration purposes, and are not intended to limit the implementation possibilities for a central security system that is accessed by mobile devices to enable automatic sanitization based on policies. In any of the possible implementations, mobile device 120 may be configured and authorized to access central network 150 on a periodic basis and/or in response to certain events (e.g., when a grace window expires, when a grace window is about to expire, when requesting access to certain objects).

Remote network 150 represents a network separated from central network 150, and through which mobile device 120 can gain access to network 110. Network 110 could be a wide area network such as the Internet, or other network that facilitates communication to central network 150. Mobile device 120 may connect to a network element such as a router, a wireless router, a gateway, etc. configured in remote network 130 to access network 110. In one example, remote network 130 may be configured as a wireless local area network (WLAN) with devices based on the Institute of Electrical and Electronics Engineers' (IEEE) 802.11 standards. In other examples, mobile device 120 may connect via a wire (e.g., a Universal Serial Bus (USB) cable) to a router or other network element of remote network 130. Examples of remote network 130 include, but are not limited to, a home network, a public facility such as a coffee shop, a restaurant, a hotel, a business, etc.

Radio signal communications over a cellular network may also be provided in communication system 100. Suitable interfaces and infrastructure may be provided to enable communication with the cellular network and between the cellular network and packet data networks such as the Internet. Radio tower 115 may operate using any mobile telecommunications technology such as, for example, 3G or 4G. Mobile device 120 may be configured with a transceiver that enables communications to radio tower 115. Radio tower 115 may communicate with a mobile service provider (not shown), which can translate radio signals into a data packets to be propagated through network 110 and central network 150.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). The term 'data' as used herein, refers to any type of binary, numeric, voice, video, media, textual, or script data, or any type of source or object code, or any other suitable information in any appropriate format that may be communicated from one point to another in electronic devices and/or networks. An object is intended to include electronic files containing any type of data and program files containing instructions that can be understood and processed by a computer (e.g., software, code, logic, etc.). Additionally, messages, requests, responses, and queries are forms of network traffic, and therefore, may comprise packets, frames, signals, data, objects, etc.

Central security system 140 includes one or more network elements that facilitate network flows in central network 150. As used herein, 'network elements' are meant to encompass routers, switches, gateways, bridges, loadbalancers, firewalls, inline service nodes, proxies, servers, processors, modules, or any other suitable device, component, element, proprietary appliance, or object operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

In a particular implementation, central security system 140 may include a server or an appliance for managing policies, authorizing grace windows for mobile devices to be disconnected from central security system 140, and authorizing grace windows for data access by mobile devices. In an embodiment, central sanitization module 143 can configure mobile devices with policies that specify an allowable period of disconnection (i.e., a grace window for disconnection) from central network 150 and what object is selected for sanitization when the allowable period of disconnection expires.

In some embodiments, central security system 140 may also include a central data access module 145 that manages access by mobile devices to data provided by, or otherwise under the control of, central network 150. Central data access module 145 may configure mobile devices with policies that specify an allowable period of access to requested objects (i.e., a grace window for data access). In an embodiment, central data access module 145 can also provide a requested object to the mobile device. In another embodiment, the requested object may already be stored on the mobile device. In this implementation, if the request for access to the object is approved, central data access module 145 can provide decryption information (e.g., a unique key for decrypting or otherwise unlocking the requested object) to the mobile device.

Policies 144, entity data 146, and key mapping 148 may provide information used by central security system 140 to enable automatic sanitization of mobile devices. In an embodiment, policies 144 contain policies for mobile devices that specify, for example, allowable periods of disconnection, allowable periods of access to requested objects, and selected objects for sanitization when allowable periods of disconnection expire. Entity data 146 can include any or all objects of a protected network, including confidential, proprietary, and/or sensitive data. Key mapping 148 provides a mapping between objects and corresponding decryption information, such as unique keys that enable access to the entity data by decryption or other unlocking mechanism.

Policies 144, entity data 146, and key mapping 148 may each be stored in the form of one or more databases, tables, caches, or any other suitable storage structure, or any suitable combination thereof. Policy database 144, entity data 146, and key mapping 148 may be internal to central security system 140 or external (entirely or in part) using, for example, some network storage technique such as network attached storage (NAS) or storage area network (SAN). In addition, key mapping 148 may use any suitable mapping, marking, or linking technique (e.g., pointers, indexes, file names, relational databases, hash table, etc.), or any other technique that represents a relation or connection between the 'mapped' items.

Mobile device 120 is representative of one or more mobile devices that have network access rights to a protected network and to central security system 140. Central security system 140 is provided in central network 150, which could be the protected network or could be another network as previously described herein. Mobile devices are intended to include mobile phones, smart mobile phones (smartphones), e-book readers, tablets, iPads, personal digital assistants (PDAs), laptops or electronic notebooks, and any other similar device, component, element, or object capable of initiating voice, audio, video, media, or data exchanges 'over the air' in communication system 100. Potentially numerous other mobile devices may be configured to access the protected network (and central network 150). Access by multiple mobile devices may originate from any number of remote networks or through any number of different cellular networks.

In an embodiment, mobile device 120 can include local sanitization module 123 and sanitization settings 124. Sanitization settings 124 may be configured by central security system 140 and may include configuration information for an allowable period of disconnection (or grace window) for mobile device 120. In an embodiment, configuration information can be provided to mobile device 120 by central security system 140 in a message that authorizes the mobile device to activate a grace window. In another embodiment, configuration information is already available to mobile device 120, and central security system 140 may simply authorize the mobile device to use the available configuration information to activate a grace window.

Configuring the mobile device with an allowable period of disconnection (or grace window) could depend on the particular implementation. For example, an expiry time could be stored in sanitization settings 124. The expiry time could indicate a date and/or time when the allowable period of disconnection expires. In another implementation, an amount of time (e.g., dates, hours, minutes, etc.) could be stored in sanitization settings 124. The amount of time could represent a length of time disconnection is permitted. Thus, the amount of time could be added to the last connection time of the mobile device and then compared to a current date/time to determine whether the allowable period of disconnection has expired. In some embodiments, sanitization settings 124 may also be updated with the connection date/time whenever mobile device 120 accesses central network 150.

Sanitization settings 124 may also include information that indicates which one or more objects to wipe from mobile device 120 if the allowable period of disconnection expires. For example, the one or more objects indicated could be a subset of all objects on the device. In one implementation, a subset of objects could include objects obtained from the protected network accessed by the mobile device. In another example, the one or more objects indicated could include everything on the device.

In an embodiment, mobile device 120 may also have monitoring module 127, local data access module 125, and object mapping 126. Local data access module 125 may be configured to request access to certain objects. The request can be sent to a central system such as central security system 140 in central network 150. If the request is authorized, then depending on the implementation, mobile device 120 can receive the requested objects. Mobile device 120 may also receive decryption information such as a unique key to decrypt or otherwise unlock the objects. If the objects are already stored on mobile device 120, then mobile device 120 may only receive the decryption information.

In an embodiment, object mapping 126 may be configured by central security system 140 and may include configuration information for one or more allowable periods of access (or grace windows) mapped to requested objects. Object mapping may also include decryption information mapped to requested objects. In an embodiment, mobile device 120 may receive, from central security system 140, configuration information to activate a grace window for access to a requested one or more objects. In another embodiment, when configuration information is already available to mobile device 120, central security system 140 may simply authorize the mobile device to use the available configuration information to activate a grace window for a requested one or more objects.

In an example embodiment, at any given time, object mapping 126 may include configuration information for one or more grace windows mapped to various requested objects. For example, in response to a request from mobile device 120 to access object A, grace window A may be activated on mobile device 120. Subsequently, in response to a request from mobile device 120 to access object B, grace window B may be activated on mobile device 120. Grace windows A and B may or may not overlap, and may or may not expire at the same time. In an embodiment, configuration information may be specific to each mobile device or subset of mobile devices. Accordingly, each grace window that is activated for access to an object on a particular mobile device is configured to expire after the same amount (or length) of time, but potentially at different times. In another embodiment, configuration information may be specific to each requested object or each group of requested objects. Accordingly, grace windows may be activated on a mobile device for varying lengths of time depending upon the object or group of objects requested. Monitoring module 127 can monitor the allowable periods of access (or grace windows) and automatically sanitize the mobile device (e.g., by deleting the key and/or objects mapped to an expired grace window) when the allowable periods expire.

Configuring the mobile device with an allowable period of access (or grace window) to one or more requested objects could depend on the particular implementation. For example, an expiry time could be stored and mapped to one or more objects in object mapping 126. The expiry time could indicate a date and/or time when the allowable period of access to the one or more objects expires. In another implementation, an amount of time (e.g., dates, hours, minutes, etc.) and a connection time associated with the mobile device's request for access could be stored and mapped to one or more objects in object mapping 126. The amount of time could represent a length of time that accessing the one or more objects is permitted. Thus, the amount of time could be added to the connection time of the mobile device and then compared to a current date/time to determine whether the allowable period of access to the one or more objects has expired.

Sanitization settings 124 and object mapping 126 may each be stored in the form of one or more databases, tables, caches, or any other suitable storage structures, or any suitable combination thereof. Typically, sanitization settings 124 and object mapping 126 are stored in mobile device 120 and are configured, at least partially, with information from central security system 140. Object mapping 126 may use any suitable mapping, marking, or linking technique (e.g., pointers, indexes, file names, relational databases, hash table, etc.), or any other technique that represents a relation or connection between the 'mapped' items.

In various embodiments, central security system 140 and mobile devices, such as mobile device 120, include logic (and/or reciprocating logic) that can coordinate, manage, or otherwise cooperate in order to achieve automatic sanitization of mobile devices, as outlined herein. Note that each of these elements can have an internal structure (e.g., processors 121, 141, memory elements 122, 142, etc.), as further described herein, to facilitate some of the sanitization operations. In other embodiments, some of the sanitization activities may be provided external to these elements, included in other devices to achieve these intended functionalities, or consolidated in any appropriate manner. The logic may be implemented as software, hardware, firmware, or any suitable combination thereof. Additionally, these elements may include any suitable algorithms, hardware, firmware, software, components, modules, interfaces, or objects that facilitate the operations thereof.

Figure 2:
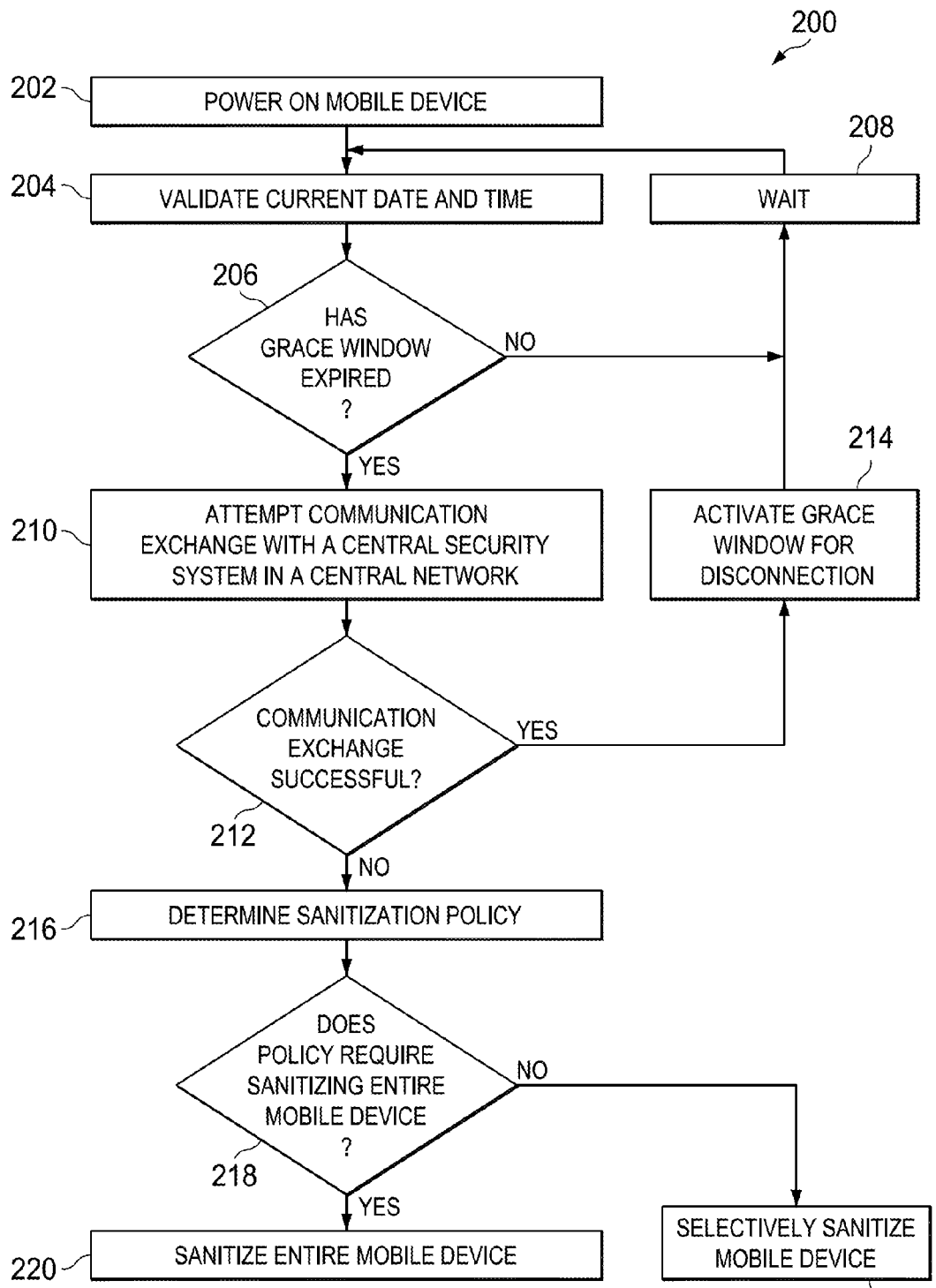
FIG. 2 is a simplified flow chart illustrating example operations that may be associated with a mobile device in an embodiment.

Turning to FIG. 2, FIG. 2 is a flow chart that illustrates a flow 200 of activities that may be performed, at least in part, by local sanitization module 123 of mobile device 120. Initially, mobile device 120 may be powered on at 202 by a user. At 204, the current date and time are validated. In an embodiment, the current date and time may be validated each time the mobile device powers on and periodically while the device is powered on.

The current date and time can be validated to determine whether a grace window has expired at 206. If the grace window is activated by an expiry time (i.e., a date or a date and time that indicates when the grace window expires), then the expiry time may be compared to the current date and time to determine whether the grace window has expired. If the grace window is activated by an amount of time configuration, then the time lapse between the last connection time and the current date and time can be calculated. The time lapse can be compared to the amount of time to determine whether the grace window has expired. In another example, an expiry time could be calculated using the amount of time and the last connection time. The calculated expiry time could be compared to the current date and time to determine whether the grace window has expired.

If the grace window has not expired, as determined at 206, then the flow may pause for a predetermined wait time at 208. After the predetermined wait time has passed, then the current date and time may be validated again at 204, to determine whether the grace window has expired at 206. Thus, the current date and time is validated and the grace window expiration is checked periodically, based on the predetermined wait time, until the grace window eventually expires or is reactivated.

If the grace window expires, as determined at 206, then at 210, the mobile device may attempt to establish a network connection with a central security system in a central network. The network connection can enable data packets to be exchanged between the mobile device and the central security system. In an embodiment, the central network is a network that the mobile device is configured and authorized to access. For example, the central network could be a protected network owned or otherwise under the control of a particular entity. In another example, the central network could be a cloud network managed by, or containing data managed by, the entity associated with a protected network that the mobile device is configured and authorized to access.

The communication exchange is successful between the mobile device and the central security system, as determined as 212, when the mobile device receives a message from the central security system, and the message authorizes the mobile device to activate a grace window for disconnection. Depending on the implementation, the message could include configuration information such as an expiry time or an amount of time disconnection is permitted (i.e., amount of time allowed for a grace window). In another implementation, the message could provide authorization to activate a grace window based on the mobile device's available configuration information for allowable periods of disconnection.

Sanitization policies may also be sent to the mobile device from the central security system. Sanitization policies can specify which objects are to be deleted from a mobile device if a grace window for disconnection expires. If the sanitization policies in the central security system have been updated, then the sanitization policies may be sent to the mobile device during a communication exchange.

If a message authorizing the grace window is received by the mobile device, then at 214, the mobile device can activate a grace window based on the received or available configuration information. In an example embodiment, the mobile device can activate a grace window by storing the configuration information in a particular memory location of the mobile device 120 (e.g., in sanitization settings 124). The most recent connection time (e.g., a date, a date and time) of the mobile device and the central security system may also be stored in the mobile device (e.g., in sanitization settings 124) in some embodiments. The most recent connection time could be included in the message received from the central security system, or the mobile device could determine it. If there is a currently active grace window on the mobile device, it can be disabled. For instance, the configuration information for the currently active grace window could be deleted, overwritten, moved, hashed, etc.

After the grace window has been activated at 214, then the flow may pause for a predetermined wait time at 208. After the predetermined wait time expires, the mobile device may begin periodically checking to see if the grace window has expired, at 204 and 206, as previously described herein.

If the communication exchange between the mobile device and the central security system is not successful, as determined at 212, then at 216, a determination may be made as to how the mobile device should be sanitized. In particular, the determination can include which particular objects are to be deleted or otherwise removed from the mobile device. The objects to be deleted can be specified by policies configured in sanitization settings 124. If a policy requires sanitizing the entire mobile device, as determined at 218, then the entire mobile device can be wiped clean at 220. However, if it is determined at 218 that a policy specifies only selected objects to be sanitized (e.g., confidential, sensitive or proprietary information), then at 222, the mobile device may be selectively sanitized by deleting objects specified by policy.

In some embodiments, an attempt to communicate with the central security system (e.g., at 212) may be performed before a grace window has expired. For example, a communication exchange could be attempted on a periodic basis in some implementations. In other implementations, the communication exchange could be attempted at predetermined days/times or at any other times prior to the expiration of the grace window. This may be desirable to avoid a scenario in which the central security system goes off-line at a time that coincides with one or more grace windows expiring on mobile devices. In such a scenario, the central security system may not be capable of authorizing a new grace window, and consequently, the mobile devices might sanitize themselves.

Figure 3:
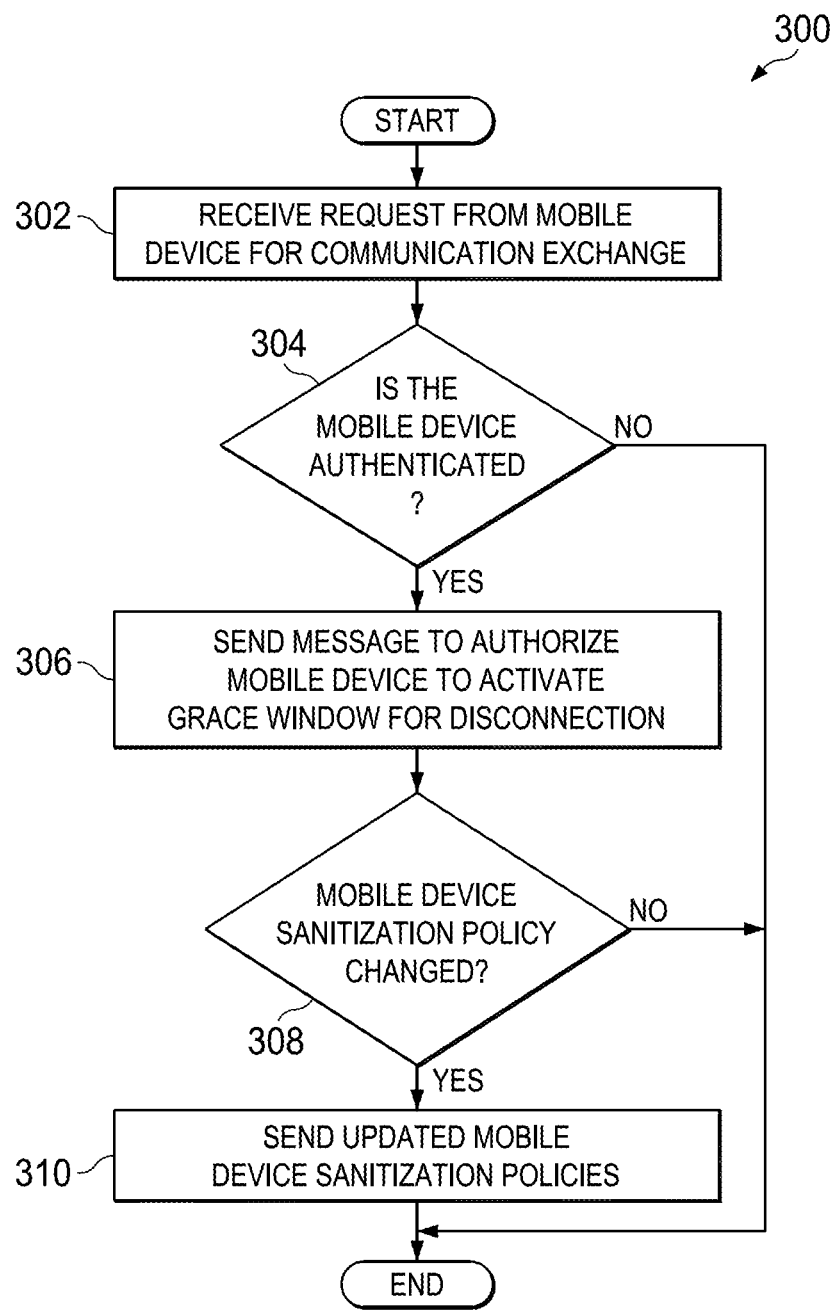
FIG. 3 is a simplified flow chart illustrating example operations that may be associated with a central security system in an embodiment.

FIG. 3 is a flow chart that illustrates a flow 300 of activities that may be performed, at least in part, by central sanitization module 143 of central security system 140. At 302, the central security system receives a request from a mobile device for communication exchange. The communication exchange is essentially a 'call home' request to update the grace window for disconnection to ensure the mobile device does not erase some or all of its own data unnecessarily.

The mobile device may identify itself to central security system 140 via a cryptographic exchange. If the mobile device is not authenticated, as determined at 304, then the flow may end, and thus, the central security system does not authorize the activation of a new grace window for disconnection on the mobile device. In this scenario, the mobile device can sanitize itself when the previously configured grace window has expired.

If the mobile device is authenticated, as determined at 304, then at 306, the central security system may send a message that authorizes the mobile device to activate a new grace window for disconnection. The allowable period of disconnection could be based on policies, for example, from a policy database accessible to the central security system. A policy could be configured specifically for the mobile device (or user), for all mobile devices (or users) associated with a protected network, or for a subset of mobile devices (or users)

associated with the protected network. For example, mobile devices of users that access highly sensitive and proprietary information (e.g., legal department, financial department) may have a shorter grace window than mobile devices of other users that access the protected network.

Depending on the implementation, the message to the mobile device could include configuration information such as an expiry time or an amount of time disconnection is permitted. In some embodiments, the central security system may also provide a date and time indicating the last connection time between the mobile device and the central security system. Otherwise, the mobile device itself may determine and update the connection time, if needed. In other implementations the message may not include configuration information, but may simply authorize the mobile device to activate a grace window based on configuration information already available to the mobile device.

At 308, the central security system may determine whether a sanitization policy for the mobile device has changed. In particular, the policies may be evaluated to determine whether the objects specified for deletion have changed. If the policies have changed since the last time the mobile device was configured with that information, then at 310, the central security system may update those policies on the mobile device. The central security system may send, to the mobile device, the one or more updated sanitization policies that specify what objects are to be deleted if the grace window expires. In one example, these policies may be configured in sanitization settings 124. If it is determined at 308 that the mobile device sanitization policies have not changed, however, then flow 300 can end.

Figure 4:
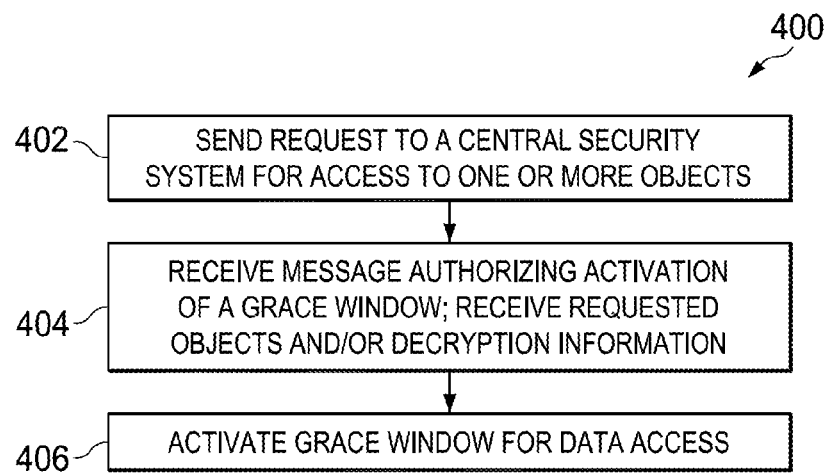
FIG. 4 is a simplified flow chart illustrating example operations that may be associated with a mobile device in another embodiment.

FIG. 4 is a flow chart that illustrates a flow 400 of activities that may be performed, at least in part, by local data access module 125 of mobile device 120. A mobile device that is configured and authorized to access resources in a protected network, may also be configured to request authorization to access data in that network. At 402, the mobile device can send a request to a central security system for access to one or more objects. The one or more objects may or may not be stored on the mobile device. If the objects are already stored on the mobile device, however, then they may be encrypted or otherwise secured to prevent unauthorized and/or uncontrolled access via the mobile device.

At 404, the mobile device receives a message authorizing the mobile device to activate a grace window for data access. During the grace window, the requested objects can be accessed via the mobile device. Depending on the implementation, the message could include configuration information such as an expiry time or an amount of time data access is permitted (i.e., amount of time allowed for a grace window). In another implementation, the message could provide authorization to activate a grace window based on the mobile device's available configuration information for allowable periods of access to requested objects. In some embodiments, the mobile device may also receive a connection time corresponding to the current network connection between the mobile device and the central security system, in which the mobile device is requesting access to the one or more objects.

If the requested objects are already stored on the mobile device, then at 404, the mobile device may receive decryption information, such as a unique key that can decrypt the objects and enable a user to access the decrypted objects via the mobile device. If the requested objects are not already stored on the mobile device, then the mobile device may receive the requested objects from the central security system. If the received objects are encrypted, then decryption information for the objects may also be received.

If a message authorizing a grace window is received by the mobile device at 406, the mobile device can activate the grace window based on the received or available configuration information. In an example embodiment, the mobile device can activate a grace window by mapping the configuration information (e.g., provided in the message or provided from the mobile device's available configuration information) to the requested objects. Decryption information may also be mapped to the requested objects. The connection time (e.g., a date, a date and time), corresponding to the current network connection between the mobile device and the central security system, may also be mapped to the requested objects in some embodiments. In an example embodiment, one or more of these mappings may be stored in object mapping 126 of mobile device 120.

Figure 5:
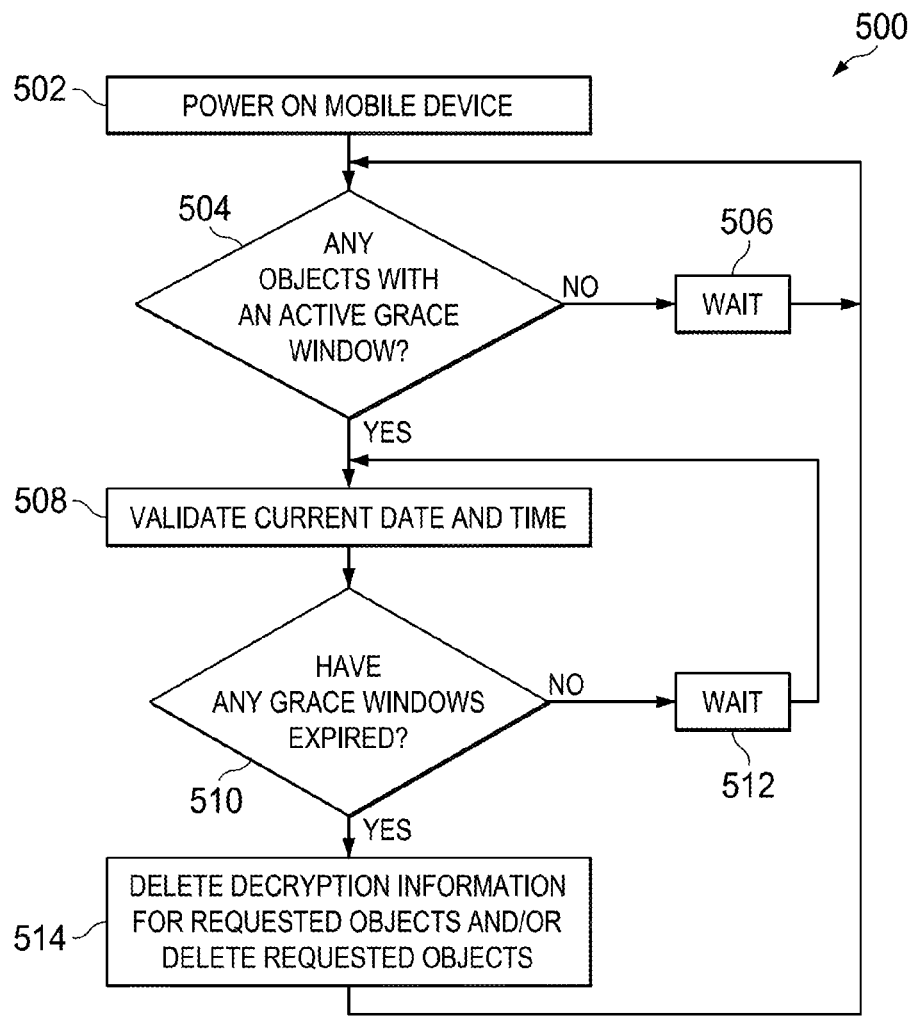
FIG. 5 is a simplified flow chart illustrating further example operations that may be associated with a mobile device in another embodiment.

Turning to FIG. 5, FIG. 5 is a flow chart illustrating a flow 500 of activities that may be performed, at least in part, by monitoring module 127 of mobile device 120. Initially at 502, mobile device 120 may be powered on. At 504, a determination may be made as to whether there any objects on the mobile device that have an active grace window. In an embodiment, this determination may be made from object mapping 126 in which configuration information for grace windows is mapped to particular objects.

If there are no objects with a currently active grace window, then flow may pause for a predetermined wait time at 506. Once the predetermined wait time has passed, flow passes back to 504, where another check is made to determine whether any objects now have an active grace window. Thus, this check may be periodically performed, based on the predetermined wait time, until the mobile device requests access to particular objects that cannot be accessed without authorization and a grace window.

If it is determined, at 504, that one or more objects have an active grace window, then a current date and time may be validated at 508. In an embodiment, the current date and time may be validated periodically, based on a predetermined wait time or other criteria as previously described herein, while the device is powered on.

The current date and time can be validated to determine whether any active grace windows for data access have expired at 510. If a grace window is activated by an expiry time (i.e., a date or a date and time that indicates when the grace window expires), then the expiry time may be compared to the current date and time to determine whether the grace window has expired. If a grace window is activated by an amount of time configuration, then it also may have a corresponding connection time. The corresponding connection time indicates the date (or the date and time) that the mobile device requested access to the one or more objects covered by the grace window. The time lapse between the connection time and the current date and time can be calculated. The time lapse can be compared to the amount of time to determine whether the grace window has expired. In another example, an expiry time could be calculated using the amount of time and the corresponding connection time. The calculated expiry time could be compared to the current date and time to determine whether the grace window has expired.

If the grace window has not expired, as determined at 510, then the flow may pause for a predetermined wait time at 512. After the predetermined wait time has passed, then the current date and time may be validated again at 508, to determine whether the grace window has expired at 510. Thus, the current date and time is validated and the grace window expiration is checked periodically, based on the predetermined wait time or other criteria, until the grace window eventually expires or is reactivated.

If a grace window expires, as determined at 510, then at 514, the mobile device may sanitize itself. For example, the mobile device may delete decryption information for one or more objects that are associated with the expired grace window. In addition, or alternatively, the mobile device may delete the one or more objects associated with the expired grace window (e.g., objects mapped to the configuration information for the expired grace window). In an embodiment, some or all of the information to be deleted may be provided in object mapping 126.

Figure 6:
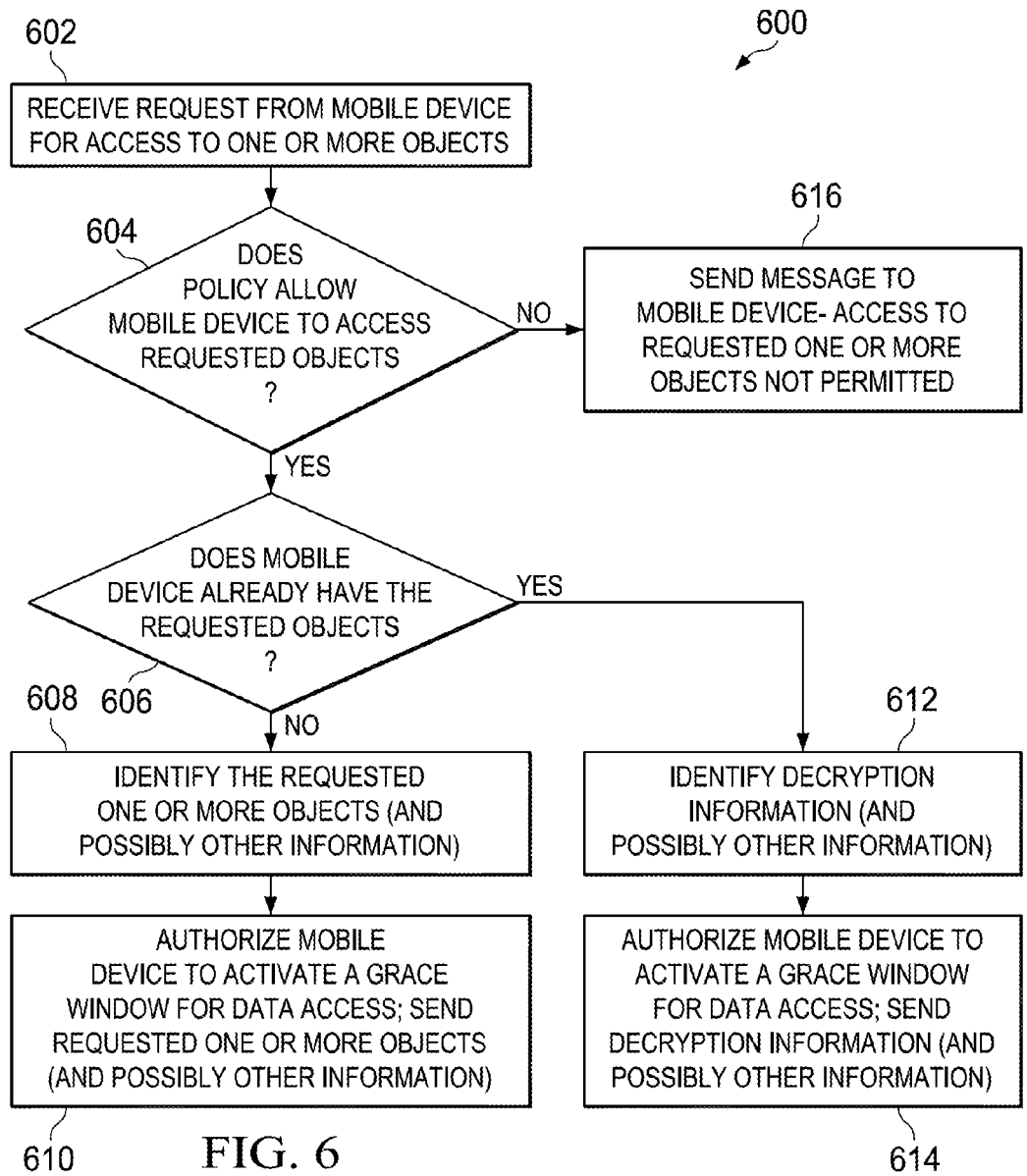
FIG. 6 is a simplified flow chart illustrating example operations that may be associated with a central security system in another embodiment.

FIG. 6 is a flow chart that illustrates a flow 600 of activities that may be performed, at least in part, by central data access module 145 of central security system 140. At 602, the central security system receives a request from a mobile device for access to one or more objects. At 604, a determination is made as to whether a policy (e.g., in policies 144) allows the mobile device (or the user of the mobile device) to access the requested objects. If a policy does not allow access to the requested objects by the mobile device (or its user), then at 616, the central security system may send a message to the mobile device indicating that access to the requested objects is not authorized.

If it is determined, at 604, that a policy allows access to the requested objects by the mobile device, then the information sent to the mobile device may depend upon whether the mobile device already has the requested objects, as determined at 606. If the mobile device does not already have the requested objects, then at 608, the requested objects may be identified (e.g., in entity data 146). Other information may also be identified at 608. For instance, decryption information corresponding to the requested objects may be identified if the objects are encrypted. Decryption information could be one or more unique decryption keys mapped to the requested objects and stored in key mapping 148. In some embodiments, a connection time may be identified. The connection time could be a date or a date and time. The connection time corresponds to the current connection between the mobile device and the central security system, in which the mobile device is requesting access to the one or more objects.

The central security system may also identify configuration information for an allowable period of access (i.e., a grace window for data access) to the requested objects. The amount of time allowed for a grace window could be defined based on the particular one or more requested objects, the particular mobile device (or user), the protected network as a whole, or a subset of the protected network (e.g., a particular group of mobile devices or users).

At 610, a message can be sent to the mobile device authorizing the mobile device to activate a grace window for accessing the requested one or more objects. The message may include the requested one or more objects for the mobile device. If the one or more objects are encrypted, the message can also includes the identified decryption information. Depending on the implementation, the message could include identified configuration information (e.g., expiry time, amount of time to access the requested objects) for the grace window. The message could also include the identified connection time corresponding to the current network connection between the mobile device and the central security system. In other implementations, the message may not include configuration information for a grace window because such configuration information may already be available on the mobile device.

If the mobile device already has the requested objects, as determined at 606, then the objects may be encrypted to prevent unauthorized access. Accordingly, at 612, decryption information corresponding to the requested objects may be identified. Other information may also be identified at 612. In some embodiments, a connection time may be identified. The connection time can be a date or a date and time. The connection time corresponds to the current connection between the mobile device and the central security system, in which the mobile device is requesting access to the one or more objects.

The central security system may also identify configuration information for an allowable period of access (i.e., a grace window for data access) to the requested objects. The amount of time for a grace window could be defined based on the particular one or more requested objects, the particular mobile device (or user), the protected network as a whole, or a subset of the protected network (e.g., a particular group of mobile devices or users).

At 614, a message can be sent to the mobile device authorizing the mobile device to activate a grace window for accessing the requested one or more objects. The message may include the identified decryption information for the one or more objects. Depending on the implementation, the message could include identified configuration information (e.g., expiry time, amount of time to access the requested objects) for the grace window. The message could also include the identified connection time corresponding to the current network connection between the mobile device and the central security system. In other implementations, the message may not include configuration information for a grace window because configuration information may already be available on the mobile device.

Figure 8:
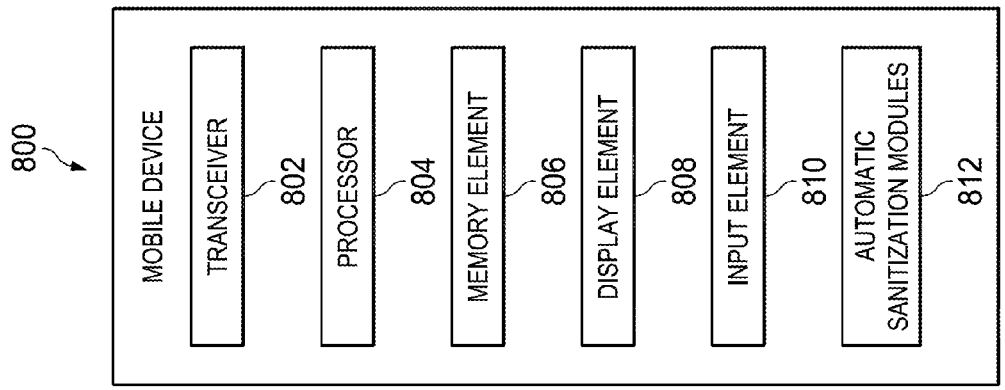
FIG. 8 is a block diagram of an example mobile device according to an embodiment.
Figure 7:
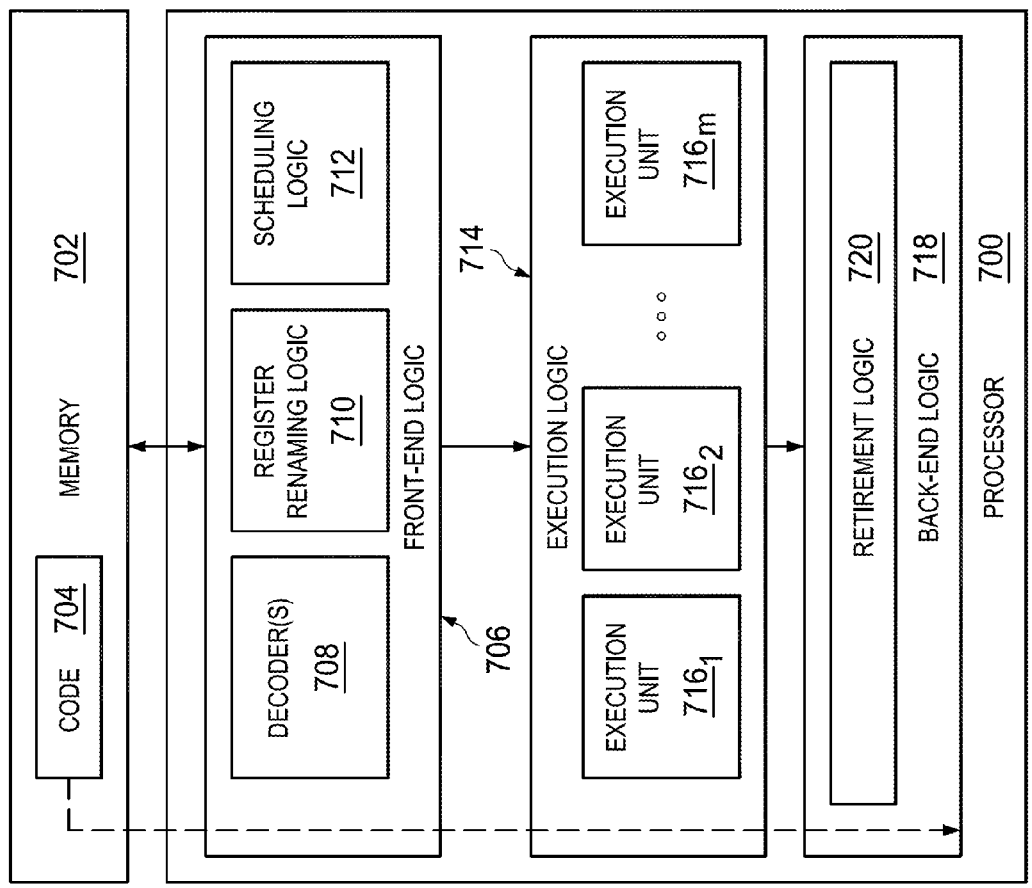
FIG. 7 is a block diagram of an example processor according to an embodiment.
Figure 9:
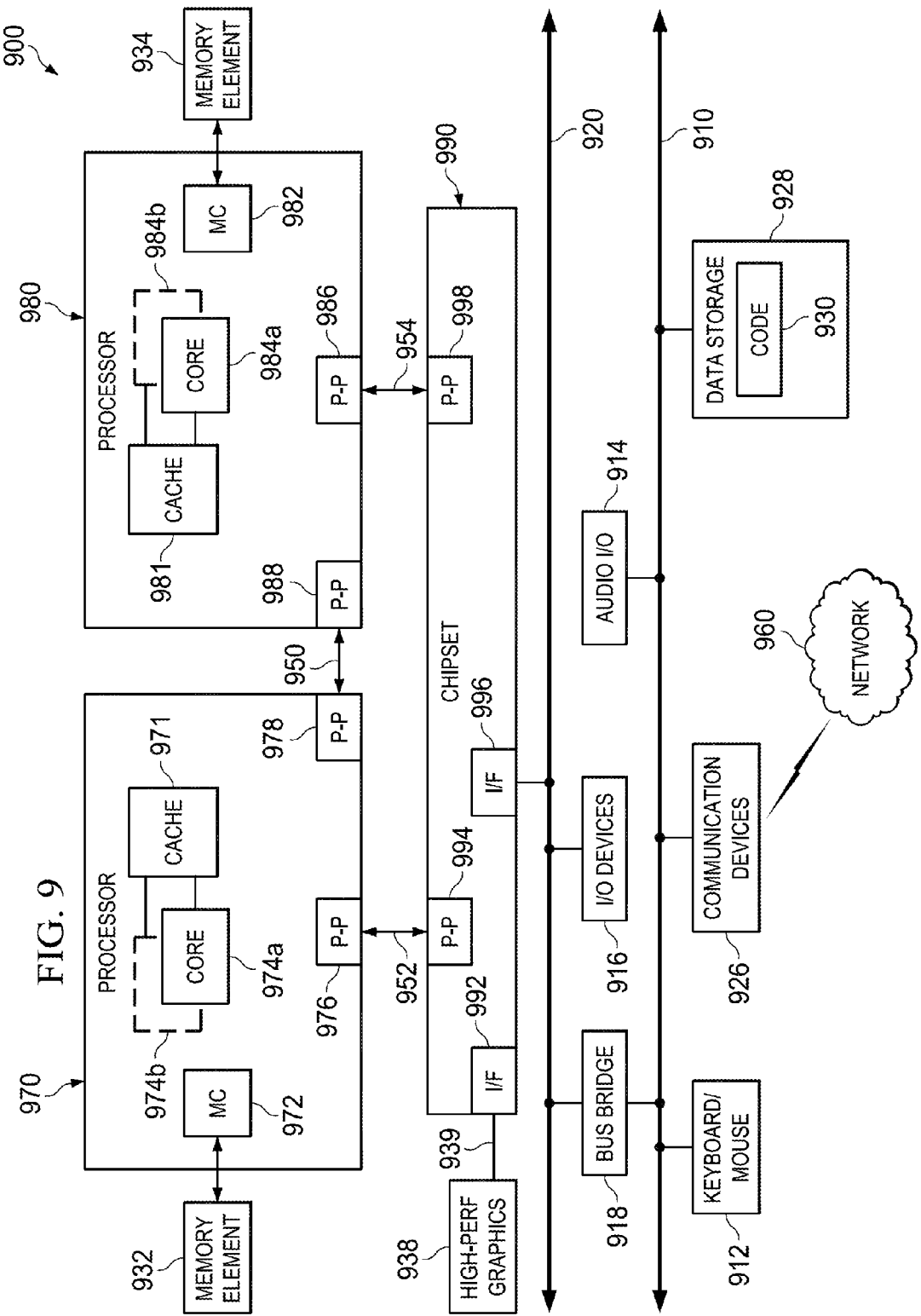
FIG. 9 is a block diagram of an example computing system according to an embodiment.

FIGS. 7-9 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 7-9.

FIG. 7 is an example illustration of a processor according to an embodiment. Processor 700 is one example embodiment of processors 121 and 141 of mobile device 120 and central security system 140, respectively.

Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 is one example embodiment of memory elements 122 and 142 of mobile device 120 and central security system 140, respectively. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with the automatic sanitization operations detailed herein. Generally, processor 700 can transform an element or an article (e.g., data) from one state or thing to another state or thing.

Code 704, which may be one or more instructions to be executed by processor 700, may be stored in memory 702. Code 704 can include instructions of various modules (e.g., local sanitization module 123, monitoring module 127, local data access module 125, central sanitization module 143, central data access module 145) that may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units $716_1$ through $716_m$. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

Referring now to FIG. 8, a block diagram is illustrated of an example mobile device 800. Mobile device 800 is one example of a mobile device, such as mobile device 120, of communication system 100. In an embodiment, mobile device 800 operates as a transmitter and a receiver of wireless communications signals. Specifically, in one example, mobile device 800 may be capable of both transmitting and receiving cellular network voice and data mobile services. Mobile services include such functionality as full Internet access, downloadable and streaming video content, as well as voice telephone communications.

Mobile device 800 may correspond to a conventional wireless or cellular portable telephone, such as a handset that is capable of receiving "3G", or "third generation" cellular services. In another example, mobile device 800 may be capable of transmitting and receiving "4G" mobile services as well, or any other mobile service.

Examples of devices that can correspond to mobile device 800 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 800 illustrated in FIG. 8 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 800 includes a transceiver 802, which is connected to and in communication with an antenna. Transceiver 802 may be a radio frequency transceiver. Also, wireless signals may be transmitted and received via transceiver 802. Transceiver 802 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4 G communications. Transceiver 802 is connected to a processor 804, which may perform the bulk of the digital signal processing of signals to be communicated and signals received, at the baseband frequency. Processor 804 can provide a graphics interface to a display element 808, for the display of text, graphics, and video to a user. Processor 804 may include an embodiment as shown and described with reference to processor 700 of FIG. 7.

In an aspect of this disclosure, processor 804 may be a processor that can execute any type of instructions to achieve automatic sanitization of mobile devices, as detailed herein. Processor 804 may also be coupled to a memory element 806 for storing information to be used in achieving the automatic sanitization operations. In an example embodiment, mobile device 800 may be designed with a system-on-a-chip (SoC) architecture, which integrates many or all components of the mobile device into a single chip, in at least some embodiments.

In an aspect of this disclosure, memory element 806 of mobile device 800 may also include automatic sanitization modules 812. For example, automatic sanitization modules 812 can include local sanitization module 123, local monitoring module 127, local data access module 125, sanitization settings 124, and object mapping 126, when mobile device 800 functions as mobile device 120.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the computing systems or mobile devices of communication system 100 may be configured in the same or similar manner as computing system 900. For example, central sanitization system 140, shown and described herein, may be configured in the same or similar manner as exemplary computing system 900. Additionally, certain embodiments (e.g., non-cellular devices such as a laptop) of mobile device 120 may also be configured in the same or similar manner as exemplary computing system 900.

Processors 970 and 980 may also each include integrated memory controller logic (MC) 972 and 982 to communicate with memory elements 932 and 934. In alternative embodiments, memory controller logic 972 and 982 may be discrete logic separate from processors 970 and 980. Memory elements 932 and/or 934 may store various data to be used by processors 970 and 980 in achieving operations associated with automatic sanitization of mobile devices, as outlined herein.

Processors 970 and 980 may be any type of processor, such as those discussed with reference to processor 700 of FIG. 7, and processors 121 and 141 of FIG. 1. Processors 970 and 980 may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a high-performance graphics circuit 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a keyboard/mouse 912 (or other input devices such as a touch screen, trackball, etc.), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system or mobile device that may be utilized to implement various embodiments discussed herein. It will be appreciated that various components of the system depicted in FIG. 9 may be combined in a system-on-a-chip (SoC) architecture or in any other suitable configuration capable of achieving automatic sanitization of mobile devices, as provided herein.

The automatic sanitization functions of communication system 100, outlined herein, may be implemented by logic encoded in one or more tangible media (e.g., embedded logic provided in an application specific integrated circuit (ASIC), digital signal processor (DSP) instructions, software (potentially inclusive of object code and source code) to be executed by a processor (e.g., processors 121, 141) or other similar machine, etc.). The tangible media may be non-transitory in at least some embodiments. In some of these instances, memory (e.g., memory elements 122, 142) can store data used for the operations described herein. This includes the memory being able to store software, logic, code, or processor instructions that are executed to carry out the activities described in this Specification. In an embodiment, the tangible media may be provided in mobile device 120 and in central sanitization system 140.

Additionally, the information being tracked, sent, received, or stored in communication system 100 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of multiple network elements, computing systems, modules, and/or other components. However, this has been done for purposes of clarity and example only. It should be appreciated that the system can be consolidated in any suitable manner. Along similar design alternatives, any of the illustrated modules, nodes, elements, and other components of FIG. 1 may be combined or divided in various possible configurations, all of which are clearly within the broad scope of this Specification. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

The following examples pertain to embodiments in accordance with this Specification. One or more embodiments may provide a method of protecting objects on a mobile device. The method may comprise: establishing a network connection to a central security system in a central network; receiving a message from the central security system; activating a grace window based on the message; determining whether the grace window has expired; and deleting, when the grace window expires, one or more objects from the mobile device based on a sanitization policy.

In an example of an embodiment, the network connection is terminated before the grace window expires, and the grace window expires unless the mobile device establishes another network connection with the central security system.

In an example of an embodiment, the activating the grace window includes storing, in the mobile device, configuration information for the grace window.

In an example of an embodiment, the message includes the configuration information.

In an example of an embodiment, the activating the grace window includes storing, in the mobile device, a connection time corresponding to the network connection, and the configuration information includes an amount of time allowed for the grace window.

In an example of an embodiment, the configuration information includes an expiry time that indicates a date and time when the grace window expires.

An example of an embodiment further comprises: receiving the sanitization policy from the central security system, where the sanitization policy identifies the one or more objects to be deleted from the mobile device when the grace window expires.

An example of an embodiment further comprises: attempting to establish another network connection with the central security system to receive a new message.

In an example of an embodiment, the attempting occurs before the grace window expires.

In an example of an embodiment, the attempting occurs after the grace window expires.

In an example of an embodiment, if the new message is received, the one or more objects are not deleted from the mobile device.

One or more embodiments may provide at least one machine accessible storage medium having instructions stored thereon for protecting objects on a mobile device. The instructions when executed by a processor cause the processor to: establish a network connection to a central security system in a central network; receive a message from the central security system; activate a grace window based on the message; determine whether the grace window has expired; and delete, when the grace window expires, one or more objects from the mobile device based on a sanitization policy.

In an example of an embodiment, the network connection is terminated before the grace window expires, and wherein the grace window expires unless the mobile device establishes another network connection with the central security system.

An example of an embodiment comprises further instructions that when executed by the processor cause the processor to: store, in the mobile device, configuration information for the grace window.

An example of an embodiment comprises further instructions that when executed by the processor cause the processor to: store, in the mobile device, a connection time corresponding to the network connection, where the configuration information includes an amount of time allowed for the grace window.

An example of an embodiment comprises further instructions that when executed by the processor cause the processor to: receive the sanitization policy from the central security system, where the sanitization policy identifies the one or more objects to be deleted from the mobile device when the grace window expires.

One or more embodiments may provide an apparatus for protecting objects. The apparatus comprises: a processor; and a sanitization module configured to execute on the processor to: establish a network connection to a central security system in a central network; receive a message from the central security system; activate a grace window based on the message; determine whether the grace window has expired; and delete, when the grace window expires, one or more objects from the mobile device based on a sanitization policy.

In an example of an embodiment, the network connection is terminated before the grace window expires, and the grace window expires unless the mobile device establishes another network connection with the central security system.

In an example of an embodiment, the sanitization module is further configured to: store, in the mobile device, configuration information for the grace window.

In an example of an embodiment, the configuration information includes an expiry time that indicates a date and time when the grace window expires.

In an example of an embodiment, the sanitization module is further configured to: receive the sanitization policy from the central security system, where the sanitization policy identifies the one or more objects to be deleted from the mobile device when the grace window expires.

One or more embodiments may provide a method of protecting objects on a mobile device. The method comprises: establishing a network connection to a central security system in a central network; sending, to the central security system, a request for access to an object; receiving a message from the central security system; activating a grace window based on the message; determining whether the grace window has expired; and preventing access to the object when the grace window expires.

In an example of an embodiment, the activating the grace window includes storing, in the mobile device, configuration information for the grace window, wherein the configuration information is mapped to the object.

In an example of an embodiment, the message includes the configuration information.

In an example of an embodiment, the activating the grace window includes storing, in the mobile device, a connection time corresponding to the network connection, where the configuration information includes an amount of time allowed for the grace window.

In an example of an embodiment, the configuration information includes an expiry time that indicates a date and time when the grace window expires.

An example of an embodiment further comprises: receiving the object in response to the request sent to the central security system.

An example of an embodiment further comprises: receiving decryption information for the object in response to the request sent to the central security system.

In an example of an embodiment, the preventing access to the object includes deleting the decryption information from the mobile device.

In an example of an embodiment, the preventing access to the object includes deleting the object from the mobile device.

One or more embodiments may provide at least one machine accessible storage medium having instructions stored thereon for protecting objects on a mobile device. The instructions when executed by a processor cause the processor to: establish a network connection to a central security system in a central network; send, to the central security system, a request for access to an object; receive a message from the central security system; activate a grace window based on the message; determine whether the grace window has expired; and prevent access to the object when the grace window expires.

An example of an embodiment comprises further instructions that when executed by the processor cause the processor to: store, in the mobile device, configuration information for the grace window, wherein the configuration information is mapped to the object.

In an example of an embodiment, the message includes the configuration information.

An example of an embodiment comprises further instructions that when executed by the processor cause the processor to: store, in the mobile device, a connection time corresponding to the network connection, where the configuration information includes an amount of time allowed for the grace window.

In an example of an embodiment, the configuration information includes an expiry time that indicates a date and time when the grace window expires.

An example of an embodiment further comprises: receiving the object in response to the request sent to the central security system.

An example of an embodiment comprises further instructions that when executed by the processor cause the processor to: receive decryption information for the object in response to the request sent to the central security system.

An example of an embodiment comprises further instructions that when executed by the processor cause the processor to: delete the decryption information from the mobile device.

An example of an embodiment comprises further instructions that when executed by the processor cause the processor to: delete the object from the mobile device.

One or more embodiments may provide an apparatus for protecting objects. The apparatus comprises: a processor; and a local data access module configured to execute on the processor to: establish a network connection to a central security system in a central network; send, to the central security system, a request for access to an object; receive a message from the central security system; and activate a grace window based on the message. The apparatus also comprises a monitoring module configured to execute on the processor to: determine whether the grace window has expired; and prevent access to the object when the grace window expires.

In an example of an embodiment, the local data access module is further configured to: store, in the mobile device, configuration information for the grace window, where the configuration information is mapped to the object.

In an example of an embodiment, the message includes the configuration information.

In an example of an embodiment, the local data access module is further configured to: store, in the mobile device, a connection time corresponding to the network connection, where the configuration information includes an amount of time allowed for the grace window.

In an example of an embodiment, the configuration information includes an expiry time that indicates a date and time when the grace window expires.

In an example of an embodiment, the local data access module is further configured to: receive the object in response to the request sent to the central security system.

In an example of an embodiment, the local data access module is further configured to: receive decryption information for the object in response to the request sent to the central security system.

In an example of an embodiment, the monitoring module is further configured to: delete the decryption information from the mobile device.

In an example of an embodiment, the monitoring module is further configured to: delete the object from the mobile device.

An example implementation for protecting objects on a mobile device may include means for establishing a network connection to a central security system in a central network; means for receiving a message from the central security system; means for activating a grace window based on the message; means for determining whether the grace window has expired; and means for deleting, when the grace window expires, one or more objects from the mobile device based on a sanitization policy. In the example implementation, the network connection may be terminated before the grace window expires, and the grace window may expire unless the mobile device establishes another network connection with the central security system. The implementation may also include means for storing, in the mobile device, configuration information for the grace window. The message may include the configuration information. The implementation may further include means for storing, in the mobile device, a connection time corresponding to the network connection, and the configuration information may include an amount of time allowed for the grace window. The configuration information may include an expiry time that indicates a date and time when the grace window expires. The implementation may additionally include means for receiving the sanitization policy from the central security system, where the sanitization policy may identify the one or more objects to be deleted from the mobile device when the grace window expires. The implementation may include means for attempting to establish another network connection with the central security system to receive a new message. The attempting occurs before the grace window expires in one example. In another example, the attempting occurs after the grace window expires. If the new message is received, the one or more objects may not be deleted from the mobile device.

An example implementation for protecting objects on a mobile device may include means for establishing a network connection to a central security system in a central network; means for sending, to the central security system, a request for access to an object; means for receiving a message from the central security system; means for activating a grace window based on the message; means for determining whether the grace window has expired; and means for preventing access to the object when the grace window expires. The implementation may also include means for storing, in the mobile device, configuration information for the grace window, and the configuration information may be mapped to the object. The message may include the configuration information. The implementation may further include means for storing, in the mobile device, a connection time corresponding to the network connection, and the configuration information may include an amount of time allowed for the grace window. The configuration information may include an expiry time that indicates a date and time when the grace window expires. The implementation may also include means for receiving the object in response to the request sent to the central security system. The implementation may include means for receiving decryption information for the object in response to the request sent to the central security system. Further, the implementation may include means for deleting the decryption information from the mobile device. Additionally, the implementation may include means for deleting the object from the mobile device.

What is claimed is:

1. A method of protecting objects on a mobile device, comprising:
    establishing a network connection from the mobile device to a central security system in a central network;
    receiving a first message from the central security system authorizing a first grace window on the mobile device;
    activating the first grace window based, at least in part, on the first message, wherein the first grace window defines a first period of time during which the mobile device can remain disconnected from the central security system without a sanitization policy being applied to the mobile device;
    attempting to establish a new network connection to the central security system to receive a second message authorizing a second grace window, wherein the attempting occurs at least once prior to the expiration of the first grace window; and if the second message is received from the central security system, activating the second grace window based, at least in part, on the second message, wherein the second grace window defines a second period of time during which the mobile device can remain disconnected from the central security system without the sanitization policy being applied to the mobile device, wherein the second period of time is based on a level of sensitivity of at least one object in a protected network that a user of the mobile device is authorized to access.

2. The method of claim 1, wherein the activating the first grace window includes storing, in the mobile device, configuration information for the first grace window.

3. The method of claim 2, wherein the first message includes the configuration information.

4. The method of claim 2, wherein the activating the first grace window includes storing, in the mobile device, a connection time corresponding to the network connection, wherein the configuration information is to include a length of time allowed for the first grace window, wherein the first period of time is based on the connection time and the length of time.

5. The method of claim 2, wherein the configuration information includes an expiry time that indicates a date and time when the first grace window expires, wherein the first period of time is based on the expiry time.

6. The method of claim 1, further comprising:
receiving the sanitization policy from the central security system, wherein the sanitization policy identifies an action to be taken by the mobile device to prevent access to one or more objects on the mobile device if the first grace window expires and a new grace window is not authorized.

7. The method of claim 6, further comprising:
attempting, if the first grace window is determined to have expired and before the action is taken by the mobile device, to establish another network connection to the central security system to receive another message authorizing another grace window.

8. At least one non-transitory machine accessible storage medium having instructions stored thereon for protecting objects on a mobile device, the instructions when executed by a processor cause the processor to:
establish a network connection from the mobile device to a central security system in a central network;
receive a first message from the central security system authorizing a first grace window on the mobile device;
activate the first grace window based, at least in part, on the first message, wherein the first grace window is to define a first period of time during which the mobile device can remain disconnected from the central security system without a sanitization policy being applied to the mobile device;
attempt to establish a new network connection to the central security system to receive a second message authorizing a second grace window, wherein the attempt is to occur at least once prior to the expiration of the first grace window; and
if the second message is received from the central security system, activate the second grace window based, at least in part, on the second message, wherein the second grace window is to define a second period of time during which the mobile device can remain disconnected from the central security system without the sanitization policy being applied to the mobile device, wherein the second period of time is based on a level of sensitivity of at least one object in a protected network that a user of the mobile device is authorized to access.

9. The at least one non-transitory machine accessible storage medium of claim 8, comprising further instructions that when executed by the processor cause the processor to:
store, in the mobile device, configuration information for the first grace window.

10. The at least one non-transitory machine accessible storage medium of claim 9, comprising further instructions that when executed by the processor cause the processor to:
store, in the mobile device, a connection time corresponding to the network connection, wherein the configuration information is to include a length of time allowed for the first grace window, wherein the first period of time is based on the connection time and the length of time.

11. The at least one non-transitory machine accessible storage medium of claim 8, comprising further instructions that when executed by the processor cause the processor to:
receive the sanitization policy from the central security system, wherein the sanitization policy identifies an action to be taken by the mobile device to prevent access to one or more objects on the mobile device if the first grace window expires and a new grace window is not authorized.

12. The at least one non-transitory machine accessible storage medium of claim 8, comprising further instructions that when executed by the processor cause the processor to:
attempt, if the first grace window is determined to have expired and before the action is taken by the mobile device, to establish another network connection to the central security system to receive another message authorizing another grace window.

13. The at least one non-transitory machine accessible storage medium of claim 8, wherein the attempt to establish the new network connection includes a determination of whether the mobile device is authenticated.

14. The at least one non-transitory machine accessible storage medium of claim 8, comprising further instructions that when executed by the processor cause the processor to:
delete, if the first grace window expires and the second message is not received from the central security system, one or more objects from the mobile device based on the sanitization policy.

15. The at least one non-transitory machine accessible storage medium of claim 8, comprising further instructions that when executed by the processor cause the processor to:
receive a second sanitization policy associated with the second message received from the central security system and authorizing the second grace window, wherein the second sanitization policy indicates another action to be taken by the mobile device if the second grace window expires and a third grace window is not authorized.

16. The at least one non-transitory machine accessible storage medium of claim 8, wherein the second period of time is a different length of time than the first period of time based, at least in part, on a level of sensitivity of at least one other object in the protected network that the user of the mobile device is authorized to access.

17. The at least one non-transitory machine accessible storage medium of claim 9, wherein the first message is to include the configuration information.

18. The at least one non-transitory machine accessible storage medium of claim 9, wherein the configuration information is to include an expiry time that indicates a date and time when the first grace window expires, wherein the first period of time is based on the expiry time.

19. The at least one non-transitory machine accessible storage medium of claim 9, wherein the configuration information is for one of: the mobile device or a group of mobile devices.

20. An apparatus for protecting objects, the apparatus comprising:
a processor; and a sanitization module configured to execute on the processor to:
  establish a network connection to a central security system in a central network;
  receive a first message from the central security system authorizing a first grace window on the mobile device;
  activate the first grace window based, at least in part, on the first message, wherein the first grace window is to define a first period of time during which the mobile device can remain disconnected from the central security system without a sanitization policy being applied to the mobile device;
  attempt to establish a new network connection to the central security system to receive a second message authorizing a second grace window, wherein the attempt is to occur at least once prior to the expiration of the first grace window; and if the second message is received from the central security system, activate the second grace window based, at least in part, on the second message, wherein the second grace window is to define a second period of time during which the mobile device can remain disconnected from the central security system without the sanitization policy being applied to the mobile device, wherein the second period of time is based on a level of sensitivity of at least one object in a protected network that a user of the mobile device is authorized to access.

21. The apparatus of claim 20, wherein the sanitization module is further configured to:
  store, in the mobile device, configuration information for the first grace window.

22. The apparatus of claim 21, wherein the configuration information includes an expiry time that indicates a date and time when the first grace window expires, wherein the first period of time is based on the expiry time.

23. The apparatus of claim 20, wherein the sanitization module is further configured to:
  receive the sanitization policy from the central security system, wherein the sanitization policy identifies an action to be taken by the mobile device to prevent access to one or more objects on the mobile device if the first grace window expires and a new grace window is not authorized.

24. The apparatus of claim 20, wherein the sanitization module is further configured to:
  delete, if the first grace window expires and the second message is not received from the central security system, one or more objects from the mobile device based on the sanitization policy.

* * * * *